Figure 1:
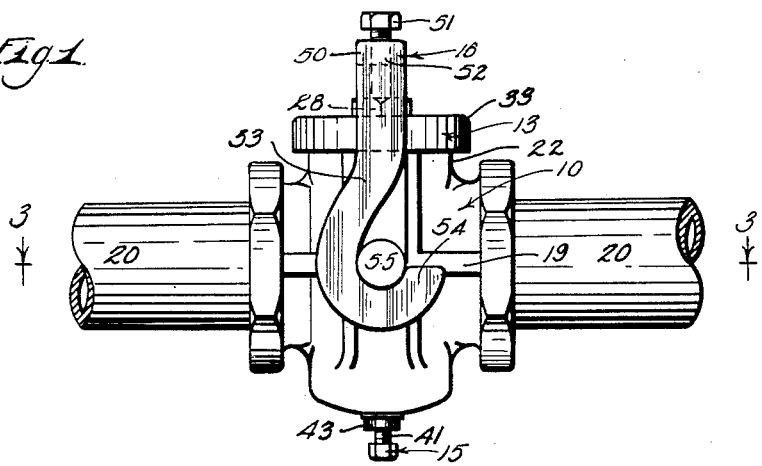

Feb. 13, 1934.   R. J. JOHNSTON   1,946,745
STOPCOCK
Original Filed Nov. 18, 1929   2 Sheets-Sheet 1

INVENTOR
RANDOLPH J. JOHNSTON
HIS ATTORNEY

Feb. 13, 1934.   R. J. JOHNSTON   1,946,745
STOPCOCK
Original Filed Nov. 18, 1929   2 Sheets-Sheet 2
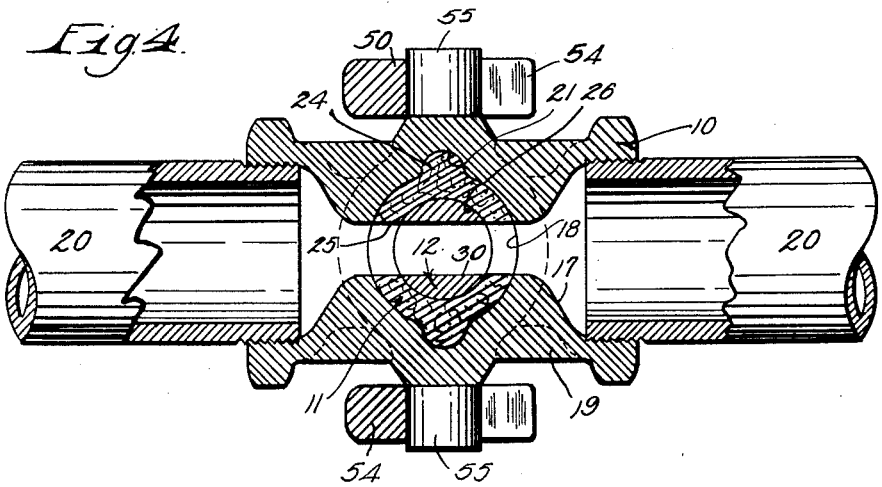
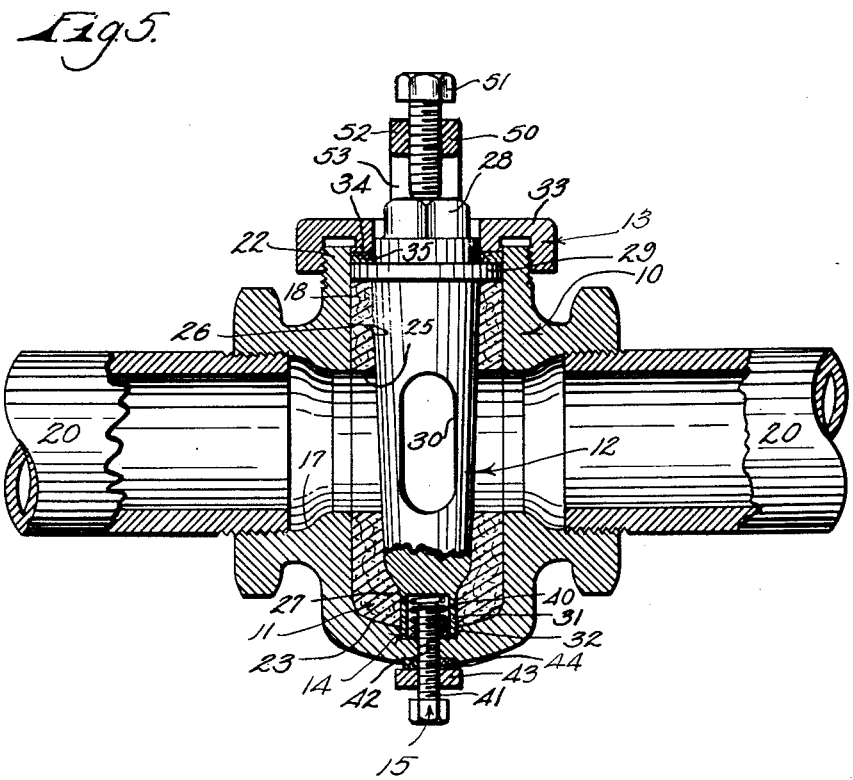
INVENTOR
RANDOLPH J. JOHNSTON
BY
HIS ATTORNEY Patented Feb. 13, 1934

1,946,745

UNITED STATES PATENT OFFICE 1,946,745

STOPCOCK

Randolph Jennings Johnston, Fresno, Calif.

Application November 18, 1929, Serial No. 407,918
Renewed August 18, 1933

2 Claims. (Cl. 251—113)

This invention relates to a stop cock, and it is a general object of the invention to provide an improved stop cock that is particularly adapted to handle fluids at high pressures.

The common forms of stop cocks used on lines or conduits handling fluids at high pressures, such as lines handling rotary mud in a well drilling rig, quickly cut out around the cores, and become inefficient.

Further, the cores of the common forms of stop cocks are driven or forced into tight sealing engagement with the bodies, and it is often necessary to jar them loose by striking them, before they can be turned or operated.

It is an object of the invention to provide a stop cock in which the core may be quickly and easily operated.

Another object of the invention is to provide a stop cock in which the core is carried in a body of packing and does not seat directly in the body of the device.

It is another object of the invention to provide a stop cock that embodies improved means for clamping or setting the core in fluid-tight sealing engagement with the packing.

Another object of the invention is to provide a stop cock of the character mentioned that embodies means for yieldingly urging the core out of sealing engagement with the packing when the clamp means referred to above is released so that the core may be easily operated.

A further object of the invention is to provide a stop cock of the character mentioned that embodies screw means for positively shifting the core to a loosened position so that it may be easily turned or operated.

It is another object of the invention to provide a stop cock of the character mentioned in which the body receives but little wear and the packing and core are replaceable.

It is a further object of the invention to provide an appliance or attachment operable to clamp the core into tight sealing engagement with the packing in the event that the usual means for clamping or setting the core becomes insufficient or ineffective.

A further object of the invention is to provide an appliance or attachment for a stop cock of the character mentioned that may be employed to force the core to a free or loose position so that it may be operated.

Another object of the invention is to provide an attachment or appliance of the character mentioned that may be applied to various forms of stop cocks to hold the cores in fluid tight sealing engagement with the bodies or with the packing.

Figure 2:
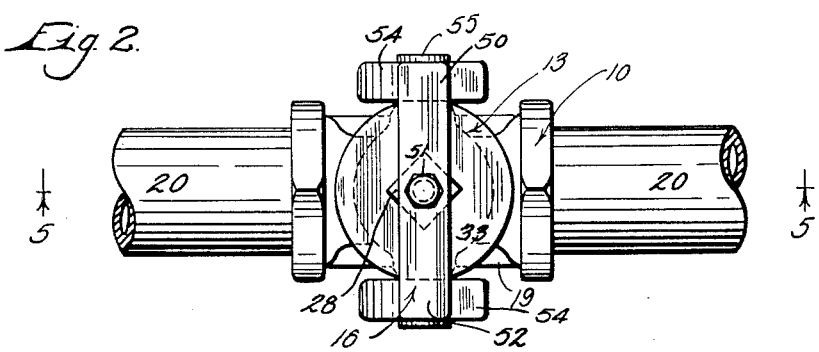
Figure 3:
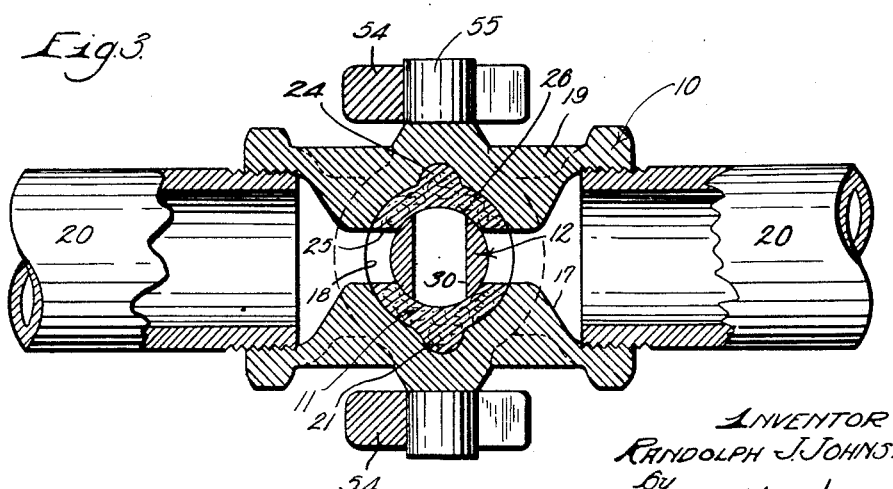

Other objects and features of my invention will be best understood from the following detailed description of a typical form and application of the invention, throughout which description reference is had to the accompanying drawings, in which:

Fig. 1 is a side elevation of the stop cock illustrating the attachment in operating position thereon. Fig. 2 is a top or plan view of the stop cock. Fig. 3 is an enlarged horizontal detailed sectional view taken as indicated by line 3—3 on Fig. 1, being a view showing the core in the closed position. Fig. 4 is a view similar to Fig. 3, showing the core in the open position, and Fig. 5 is an enlarged vertical detailed sectional view taken as indicated by line 5—5 on Fig. 2.

The stop cock provided by this invention is particularly suited for handling fluid containing solid matter at high pressures; for example, it is adapted to handle rotary mud in a well drilling rig, or the like. It is to be understood, however, that the invention is not to be considered as limited to this particular application but is to be taken as including any features or modifications that may fall within the scope of the claims.

The stop cock provided by this invention includes, generally, a body 10, packing 11 in the body, a core 12 carried in the packing 11 and operable to prevent the passage of fluid through the body, means 13 for clamping the core 12 into sealing engagement with the packing 11, means 14 for yieldingly urging the core 12 out of tight engagement with the packing 11 when the means 13 is released, screw means 15 for positively shifting the core 12 to a free position where it is adapted to be easily operated, and means 16 in the form of an attachment or appliance for clamping the core 12 into tight engagement with the packing 11 in the event that the means 13 becomes inoperative or ineffective in holding the core 12 in fluid tight engagement with the packing 11.

The body 10 is substantially hollow, having a fluid passage 17 extending through it and a transverse opening 18 for carrying the packing 11 and the core 12. The body 10 is preferably of heavy construction and may have reinforcing ribs 19 on its exterior. The passage 17 may extend diametrically through the body, and in the drawings I have illustrated pipes or conduits 20 screw threaded into the opposite end portions of the passage. The opening 18 extends into, what I will term, the upper end of the body and is of comparatively large diameter. The opening 18 is preferably of round cross sectional configuration and in accordance with the invention is of substantially the same diameter throughout its length. Further, it is preferred to form the opening 18 of uniform configuration from one end to the other. The opening 18 extends some distance below the passage 17 and its lower end or bottom is preferably curved or rounded as illustrated throughout the drawings. Vertical grooves 21 are provided in the walls of the opening 18. In the particular case illustrated there are two diametrically opposite vertical grooves 21. The passage 17 is preferably of elongated cross sectional configuration at the points where it opens into or communicates with the opening 18. At these points the passage 17 is elongated or extends in the direction of the axis of the opening 18. A flange 22 is provided at the upper end of the body 10 around the opening 18.

The packing 11 is arranged in the opening 18 and is provided to carry and seal around the core 12. The packing 11 is preferably formed of a resilient and compressible material such as rubber, or the like, and, in accordance with the preferred form of the invention, is an integral unit or body. The packing 11 is proportioned to seat tightly in the opening 18 and its lower end 23 is rounded to conform to the configuration of the lower end of the opening 18. The upper end of the packing 11 is preferably made flat and is spaced some distance below the upper end of the flange 22. Vertical ribs 24 are provided on the packing 11 to fit into the grooves 21. The ribs 24 are provided to prevent the packing 11 from turning or rotating when the core 12 is operated.

A transverse opening or passage 25 is provided in the packing 11. The passage 25 is preferably of the same configuration as the elongated portions of the passage 17 and registers with these portions of the passage 17. A vertical tapered opening 26 is provided in the packing 11 to carry the core 12. The opening 26 extends into the upper end of the packing 11 and is preferably of round cross section. The opening 26 is tapered so that it has upwardly divergent side walls. The opening 26 extends into the lower portion of the packing 11 and its lower end is preferably rounded. A comparatively small or reduced opening 27 is provided at the bottom of the opening 26 and extends through the lower wall of the packing 11. The opening 27 is preferably concentric with the opening 26.

The core 12 seats in the opening 26 of the packing 11 and is operable to prevent the passage of fluid through the passage 17 of the body. The core 12 is tapered and is shaped to conform to the configuration of the opening 26, being of round cross section and having upwardly divergent side walls. The lower end of the core 12 is rounded to effectively seat in the bottom of the opening 26. The core 12 projects upwardly above the upper end of the body 10 and has a polygonal nut or projection 28 at its upper end. The projection 28 is preferably flat at its upper end and is adapted to be engaged by a wrench, or the like, for operating the core. An outwardly projecting radial flange 29 is provided on the core 12 to seat against the upper end of the packing 11. The flange 29 seats within the opening 18 of the body and its upper side is spaced some distance below the upper end of the flange 22.

An opening or passage 30 is provided in the core 12 to register with the passage 25 of the packing when the core is in the open position. The opening 30 is preferably of the same configuration as the passage 25 and the inner portions of the passage 17. A downwardly projecting tubular extension 31 is provided on the lower end of the core 12. The extension 31 extends through the opening 27 of the packing and its lower end extends into a socket 32 formed in the body 10.

The means 13, for clamping or holding the core 12 in tight sealing engagement in the opening 26 of the packing, includes a sleeve or cap 33 screw threaded onto the flange 22 of the body. The cap 33 extends over the upper end of the flange 22 and has a downwardly or axially extending part 34 extending into the opening 18. The cap 33 is provided to act through the flange 29 of the core 12 to force the core downwardly into tight engagement with the packing 11 so as to compress the packing so that it seals about the core. A packing ring 35 may be arranged between the flange 29 and the part 34 to ensure a fluid tight seal.

The means 14, for yieldingly urging the core 12 to a position where it may be easily and readily operated, is in the nature of a spring means. The means 14 includes a spring 40 arranged in the interior of the extension 31. The spring 40 may be a helical spring and is arranged under compression between the bottom of the socket 32 and the lower end of the core 12. The spring 40 is normally compressed when the cap 33 is retaining the core 12 in tight sealing engagement with the packing 11 and operates to urge the core 12 outwardly in the opening 26 when the cap 33 is loosened or unthreaded.

The means 15 for positively shifting the core 12 out of tight engagement with the packing 11 to a position where it may be easily turned or operated includes a screw 41 screw threaded through the lower wall of the body 10 and adapted to engage the lower end of the core 12. The screw 41 is threaded through an opening 42 in the body and extends into the extension 31 of the core. The screw 41 may extend through the spring 40 and its inner end is adapted to engage the lower end of the core. A nut 43 may be threaded on the screw 41 to compress a packing washer 44 against the lower end of the body 10 to seal around the screw 41. The screw 41 is normally in a position where it does not engage the core 12 and may be operated to clamp against the core when it is desired to loosen the core prior to turning or operating the core.

The means 16 is in the form of a detachable appliance that may be employed to urge the core 12 into the opening 26 of the packing to compress the packing so that it seals about the core. In practice the means 16 may be used when the cap 33 does not operate to sufficiently compress the packing 11, to prevent the leakage of fluid from around the core or from around the packing. The means 16 includes a spider or yoke 50 detachably mounted on the body 10 and carrying a screw 51 adapted to clamp against the upper end of the core 12. The yoke 50 includes a head 52 extending transversely over the top of the body 10 and arms 53 at each end of the head extending downwardly at the opposite sides of the body. The arms 53 are provided at their lower ends with hook portions 54 to engage around ears or lugs 55 on the body. The lugs 55 are preferably centrally located between the upper and lower ends of the body. The yoke 50 is preferably of heavy construction. The clamping screw 51 is screw threaded through the head 52 and is adapted to engage the upper end of the projection 28 of the core. The screw 51 is adapted to be clamped against the projection 28 when it is desired to force the core 12 into tight sealing engagement with the packing 11. The hook portions 54 of the yoke are formed so that the yoke may be readily detached from the body when desired. Further, the yoke is proportioned so that it may be inverted so that the screw 51, or a similar part, may be arranged through the opening 42 at the lower end of the body to be operated to engage the lower end of the plug 12. The yoke 50 may be employed in this manner in the event that the screw 41 and the means 14 are ineffective in loosening or shifting the core 12.

It is believed that the utility and practicability of the present invention will be apparent from the foregoing detailed description. It is to be noted that the cap 33 may be operated so as to clamp the core 12 securely into the opening 26 of the packing and cause the packing 11 to be compressed so that it seals tightly about the core and with the walls of the opening 18 of the body. The core may be readily loosened so that it can be operated by loosening the cap 33 and operating the screw 41. The core 12 does not seat directly against or directly into the body 10 at any point, so that it is not necessary to jar it loose by striking either the body or the core.

The yoke 50 or the means 16 may be employed when desired or necessary to either clamp the core 12 into the packing 11 or to force the core 12 out of the packing; further the yoke 50 may be employed on various forms of stop cocks to hold the cores in tight sealing engagement. The yoke may be used to force the core into tight sealing engagement and the cap may then be tightened to retain the core in this position so that the yoke may be removed, if desired. It is to be noted that the shapes of the packing 11 and the core 12 are such that the packing 11 is effectively compressed so that it seals about the core 12 at all points. The opening 18 of the body having parallel sides, the packing 11 may be readily removed with little difficulty.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A stop cock, including a body having a fluid passage and having a transverse cylindrical opening, a body of packing in the opening sealing against the side walls and bottom of the opening, there being a longitudinal opening in the packing, a core in the opening in the packing operable to prevent the flow of fluid through the passage, an extension on the inner end of the core extending into a recess in the bottom of the said transverse opening, and an annular flange on the outer end of the core slidably fitting the transverse opening for compressing the packing.

2. A stop cock including, a body having a fluid passage and having a transverse cylindrical opening, a body of compressible packing fitting the transverse opening, a longitudinally tapered core rotatably carried in a correspondingly shaped opening in the core and operable to prevent the flow of fluid through the passage, a flange on the core slidable in the cylindrical opening and contacting therewith and engaging an end of the body of packing, a cap screw threaded on the body to cooperate with the flange to compress the packing against the walls of the round opening, and a longitudinal rib on the body of packing extending into a groove in the body to hold the body of packing against rotation.

RANDOLPH JENNINGS JOHNSTON.